US008209673B1

(12) United States Patent
Ledebohm

(10) Patent No.: US 8,209,673 B1
(45) Date of Patent: Jun. 26, 2012

(54) SLI APPROVAL POLICY DATABASE

(75) Inventor: Herbert O. Ledebohm, Georgetown, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1309 days.

(21) Appl. No.: 11/861,104

(22) Filed: Sep. 25, 2007

(51) Int. Cl.
*G06F 9/45* (2006.01)

(52) U.S. Cl. ......................................... 717/140; 719/323

(58) Field of Classification Search ........................ None
See application file for complete search history.

(56) References Cited

U.S. PATENT DOCUMENTS

| | | | | |
|---|---|---|---|---|
| 5,867,385 | A * | 2/1999 | Brown et al. | 700/56 |
| 7,139,002 | B2 * | 11/2006 | Estrop | 345/501 |
| 7,535,433 | B2 * | 5/2009 | Ledebohm et al. | 345/1.1 |
| 2003/0131147 | A1 * | 7/2003 | Wilt et al. | 709/321 |
| 2005/0080915 | A1 * | 4/2005 | Shoemaker et al. | 709/231 |
| 2005/0285863 | A1 * | 12/2005 | Diamond | 345/519 |
| 2005/0285864 | A1 * | 12/2005 | Diamond et al. | 345/520 |
| 2005/0285865 | A1 * | 12/2005 | Diamond | 345/520 |
| 2006/0206718 | A1 * | 9/2006 | Frank et al. | 713/182 |
| 2007/0067769 | A1 * | 3/2007 | Geisinger | 718/1 |
| 2007/0268296 | A1 * | 11/2007 | Ledebohm et al. | 345/501 |
| 2008/0034238 | A1 * | 2/2008 | Hendry et al. | 713/323 |
| 2009/0158248 | A1 * | 6/2009 | Linderman et al. | 717/106 |

* cited by examiner

*Primary Examiner* — Tuan Dam
*Assistant Examiner* — Samuel Hayim
(74) *Attorney, Agent, or Firm* — Patterson & Sheridan, LLP

(57) ABSTRACT

One embodiment of the present invention sets forth a system and method for implementing a scalable link interface (SLI) approval policy using a database. The resource manager within a GPU driver incorporates a database, which may be used to determine whether the current computer system configuration is approved for running in SLI mode. The database of specific approved configurations may be embedded within the GPU driver or stored in a separate file, which may be modified by an authorized user. The database may be encrypted to prevent unauthorized users from modifying to the database contents. When a given computer system configuration is an approved configuration within the database, the system may be enabled to operate in SLI mode.

20 Claims, 6 Drawing Sheets

SLI APPROVAL POLICY DATABASE

BACKGROUND OF THE INVENTION

1. Field of the Invention

Embodiments of the present invention relate generally to graphics systems and more specifically to an SLI approval policy database.

2. Description of the Related Art

A typical computer system includes, without limitation, a central processing unit (CPU), a graphics processing unit (GPU), at least one display device, and one or more input devices, such as a keyboard and a mouse. The computer system may also include a mass storage device, such as a hard disk drive, which typically includes a file system, an operating system, and a set of applications. Advanced computer systems may augment the processing capacity of the first GPU with a second GPU, whereby the two GPUs are configured to coordinate their operations. One technology known in the art for coordinating the operation of two or more GPUs is the scalable link interface (SLI). When two or more GPUs are utilizing SLI technology to coordinate their processing, they are referred to as operating in SLI mode.

While many computer system configurations allow for two or more GPUs to operate in SLI mode, certain situations preclude the use of GPUs in SLI mode. For example, some GPU products are not licensed for use in SLI mode, although the GPU may be technically capable of performing properly in such a configuration. Additionally, certain computer systems and certain GPUs may not be capable of operating properly in SLI mode for technical reasons. To avoid configurations that attempt to violate either licensing arrangements or technical system capabilities, an approval mechanism is commonly compiled into the executable code of a GPU driver. The approval mechanism allows known and authorized multi-GPU configurations to execute in SLI mode, while precluding unknown multi-GPU configurations from executing in SLI mode. The approval mechanism is typically implemented as a compiled sequence of instructions that attempts to match the current computer system configuration to system configurations that are known to be approved SLI configurations. If a match is found, the system is allowed to operate in SLI mode. Otherwise, the system is not allowed to operate in SLI mode. Each time a new permitted configuration (known as an "approval") is added, additional executable code must be added to the GPU driver, and the GPU driver must be re-built to incorporate the new executable code.

As the number of different approved configurations grows, the amount of compiled code within the GPU driver also grows to accommodate the various approved SLI configurations, increasing the difficulty and inefficiency of managing GPU driver development. Furthermore, evaluating a new SLI configuration for potential approval requires that the GPU driver be repeatedly compiled by different individuals who need to ultimately coordinate their activities in order to properly release the GPU driver for production. Some of the individuals involved in the overall development process are developers, who need to write code for operating and managing a given GPU. However, the individuals responsible for determining which system configurations should be approved to operate in SLI mode are typically not the developers, and, in fact, tend to be much less familiar with the build process and tools for compiling the GPU driver than the developers. The need for numerous individuals to potentially modify and compile the GPU driver introduces inefficiency and opportunities for error in the overall development process.

While certain efficiencies may be gained in carefully managing the current development process, the underlying management complexity and potential for error remains a problem so long as the approval mechanism uses compiled executable code to define specific approvals. Furthermore, the current development process requires a completely new instance of the GPU driver to be built each time a new approval is being examined. Building a new GPU driver can be cumbersome and time consuming and introduces inefficiencies in the approval examination process.

As the foregoing illustrates, what is needed in the art is a mechanism for providing SLI approval within a GPU driver, but without the need to re-build the GPU driver in order to examine and incorporate new, approved SLI configurations.

SUMMARY OF THE INVENTION

One embodiment of the present invention sets forth a method for building an approval database and approving a computing device configuration for operation in scalable link interface (SLI) mode. The method includes the steps of retrieving graphics processing unit (GPU) driver source code, retrieving an SLI approval database file, compiling the GPU driver source code and the SLI approval database file, and generating a GPU driver that includes an SLI approval database based on the compiled GPU driver source code and the compiled SLI approval database file.

One advantage of the disclosed method is that the database of specific approved configurations may be embedded within the GPU driver or stored in a separate, external file, which may be modified by an authorized user. Thus, additional approvals may be created and evaluated by the authorized user without the need to rebuild the GPU driver.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
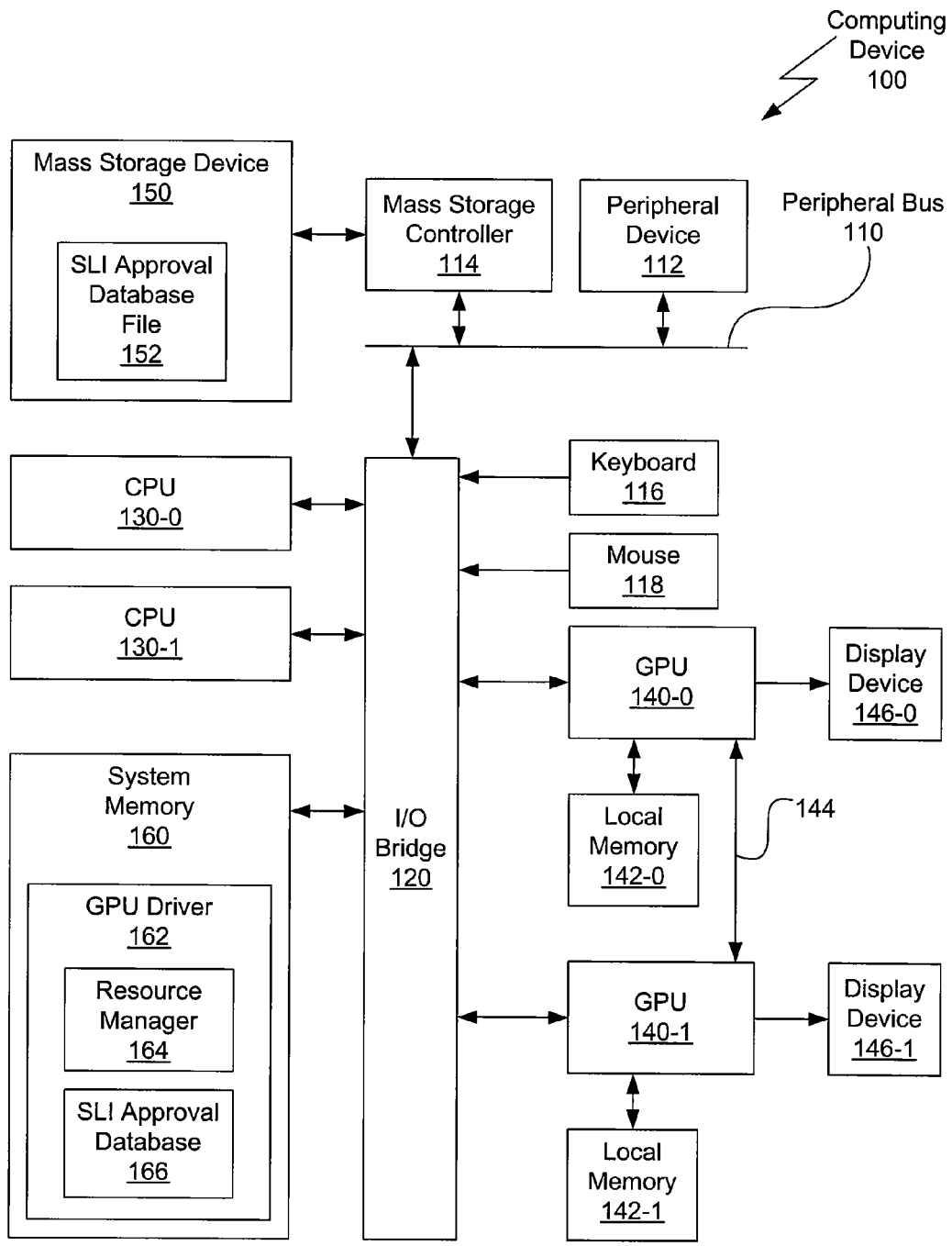
FIG. 1 depicts a computing device in which one or more aspects of the invention may be implemented.

FIG. 1 depicts a computing device 100 in which one or more aspects of the invention may be implemented. Computing device 100 may include one or more central processing units (CPU) 130, a system memory 160, an input/output (I/O) bridge 120, a keyboard 116, a mouse 118, two or more GPUs 140, and a peripheral bus 110, which may be attached to a mass storage controller 114 and a peripheral device 112.

Each GPU 140 may be attached to a local memory 142, configured to store data and programming information used by the respective GPU 140. A display device 146 may be attached to a GPU 140 and used to display frames of video data generated by the GPU. A scalable link interface (SLI) channel 144 is configured to link GPUs 140 together. The SLI channel 144 provides a physical connection for transmitting information between GPUs 140 used to coordinate the operations of the GPUs 140.

The I/O bridge 120 provides communication between the system elements. For example, the I/O bridge 120 provides a communication path for the CPU 130 to communicate with the system memory 160. Other components (not explicitly shown), including USB or other port connections, CD drives, DVD drives, film recording devices, and the like, may also be connected to I/O bridge 120. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

The system memory 160 stores programming instructions and data used by the CPU 130. The programming instructions and data may define an operating system, application programs, drivers used to manage and control system components and such. A GPU driver 162, stored within system memory 160 includes programming instructions and data used by the CPU 130 to manage and control the GPUs 140. The GPU driver 162 includes a resource manager 164 that performs detailed resource allocation, scheduling, and management of various GPU resources and operations. An SLI approval database 166 maintains a list of system configurations approved for SLI mode operation. Each system configuration that is approved for SLI mode operation is referred to herein as an "approval" and constitutes a database entry within the SLI approval database 166.

The mass storage controller 114 may be connected to a mass storage device 150, used to store data such as an operating system image, application programs, and such. The mass storage device 150 may employ a hard disk drive, memory flash, or any other type of mass storage media to store the data, which is generally organized as files within a file system. One file stored within the mass storage device 150 is an SLI approval database 152. The SLI approval database file 152 stores approvals that may be used by the GPU driver 162 in lieu of, or in addition to, the SLI approval database 166, embedded within the GPU driver 162.

Figure 2:
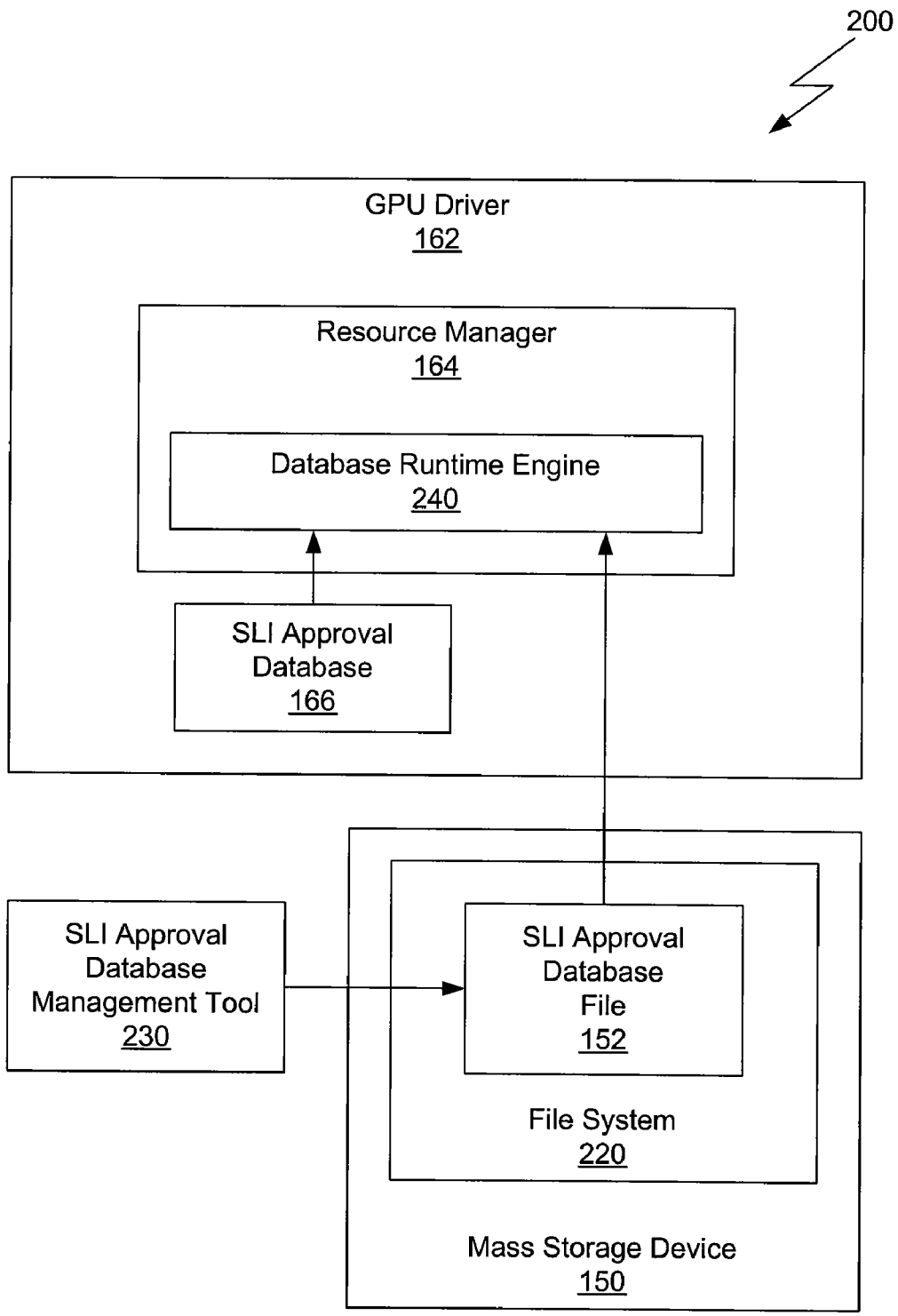
FIG. 2 illustrates an approval database software architecture including two different approval database sources, according to one embodiment of the invention.

FIG. 2 illustrates an approval database software architecture 200, including two different approval database sources, according to one embodiment of the invention. The approval database software architecture 200 includes the GPU driver 162 of FIG. 1, the mass storage device 150, and an SLI approval database management tool 230.

The GPU driver 162 includes the resource manager 164 and SLI approval data base 166. The resource manager 164 includes a database runtime engine 240, used to query the SLI approval database 166. Persons skilled in the art will recognize that the database runtime engine 240 may be implemented using a variety of technically appropriate techniques. The resource manager 164 gathers current system configuration information that describes to the current computing device 100 executing the resource manager 164. The current system configuration information may include attributes such as PCI-express bus width, GPU identifiers, chipset identifiers, and such. The current system configuration information is presented to the database runtime engine 240 as a query against approvals stored in the SLI approval database 166. If a matching approval is found within the SLI approval database 166, then the computing device 100 is permitted to run in SLI mode. If no matching approval is found within the SLI approval database 166, then the computing device 100 is not permitted to run in SLI mode. In one embodiment, the SLI approval database 166 is stored in an encrypted format to thwart unauthorized modification of the SLI approval database 166. Persons skilled in the art will recognize that various technically feasible mechanisms are available to provide encryption to the SLI approval database 166.

Data within the mass storage device 150 is organized according to a structure known in the art as a file system 220. One file stored within the file system 220 is the SLI approval database file 152, which contains a database of approvals. The database runtime engine 240 may use the SLI approval database file 152 stored within the mass storage device instead of the SLI approval database 166 stored within the GPU driver 162. In an alternate embodiment, the database runtime engine 240 may use the SLI approval database file 152 in addition to the SLI approval database 166, whereby an approval in either database constitutes approval for a given configuration.

The SLI approval database management tool 230 provides users with a mechanism to add, delete, and modify approvals within the SLI approval database file 152. The SLI approval database management tool 230 may provide users with a graphical user interface (GUI), a command line interface, or any other technically feasible interface.

In one embodiment, the SLI approval database file 152 is stored unencrypted, whereby the SLI approval database management tool 230 and database runtime engine 240 are capable of performing unencrypted access to the SLI approval database file 152. The unencrypted data may be stored in human readable "plain text" format or in a storage-efficient "binary" format. In an alternate embodiment, the SLI approval database file 152 is stored encrypted, whereby the SLI approval database management tool 230 and database runtime engine 240 are capable of performing encrypted access to the SLI approval database file 152.

Figure 3:
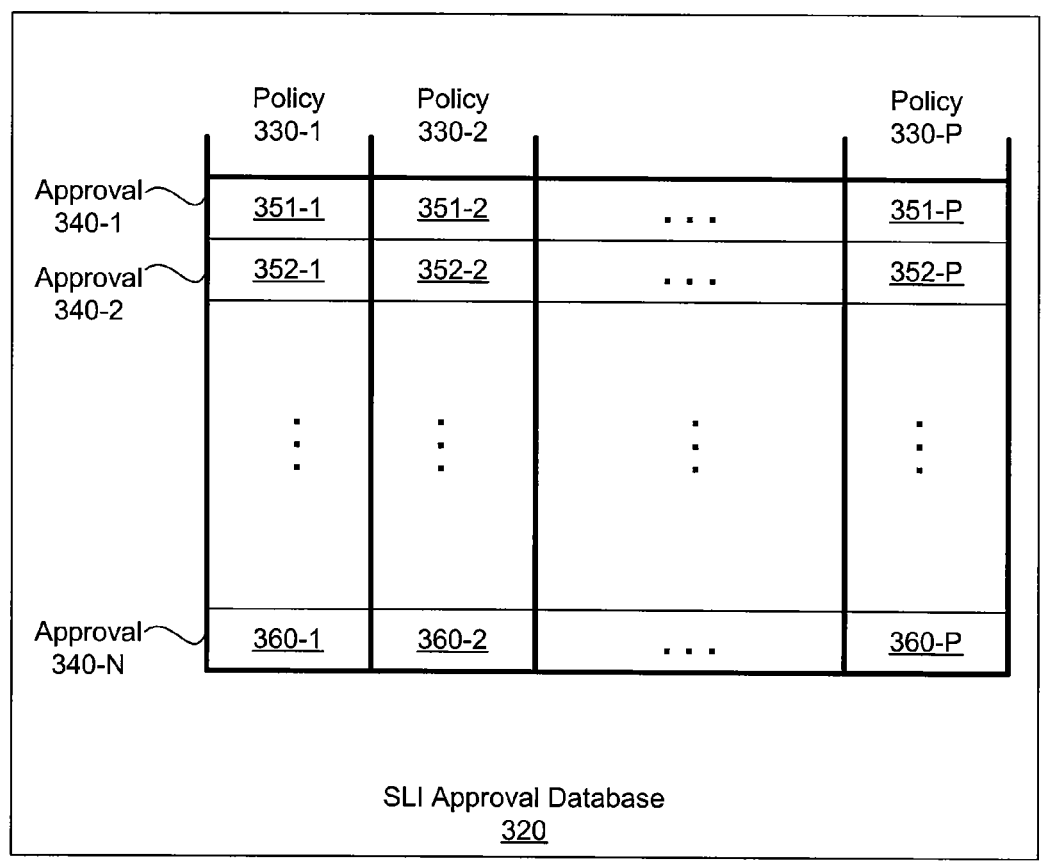
FIG. 3 illustrates an exemplary structure for an SLI approval database, according to one embodiment of the invention.

FIG. 3 illustrates an exemplary structure for an SLI approval database 320, according to one embodiment of the invention. The SLI approval database 320 includes one or more approvals 340. The approvals 340 are defined by a set of policies 330. The SLI approval database 320 may include one through N approvals, whereby each approval utilizes one through P policies to determine whether or not a given query is a match.

Each approval 340 corresponds to a configuration of the computing device 100 that is approved for SLI mode operation, as defined by a set of one or more policies 330. Each approval 340 may incorporate any given policy 330 or not, as determined by the individual nature of the specific approval. For example, approval 340-2 may require a match of policy 330-1, but not a match of policy 330-2. Furthermore, a given approval may apply to more than one specific configuration of the computing device 100. For example, one approval may require that exactly two CPUs 130 with a specific identifier be installed in the computing device 100 for SLI mode operation, whereas a different approval may only require that at least one CPU 130 of any identifier be installed. New approvals 340 may be added to the SLI approval database 320, such that each new approval 340 is defined using the available policies 330. Furthermore, existing approvals 340 may be deleted or modified within the SLI approval database 320.

Each policy 330 defines a significant system property that may be used in determining an approval. Each policy 330 may require support from functions within the GPU driver 162. Such functions are used to read system and component information and may require that new code is added to the GPU driver 162 from time to time. However, since the overall architecture of a computing device 100 tends to be relatively stable over many product generations, adding a new policy 330 should be a relatively infrequent event compared to adding a new approval 340, which may occur many times within a given product generation.

Figure 4A:
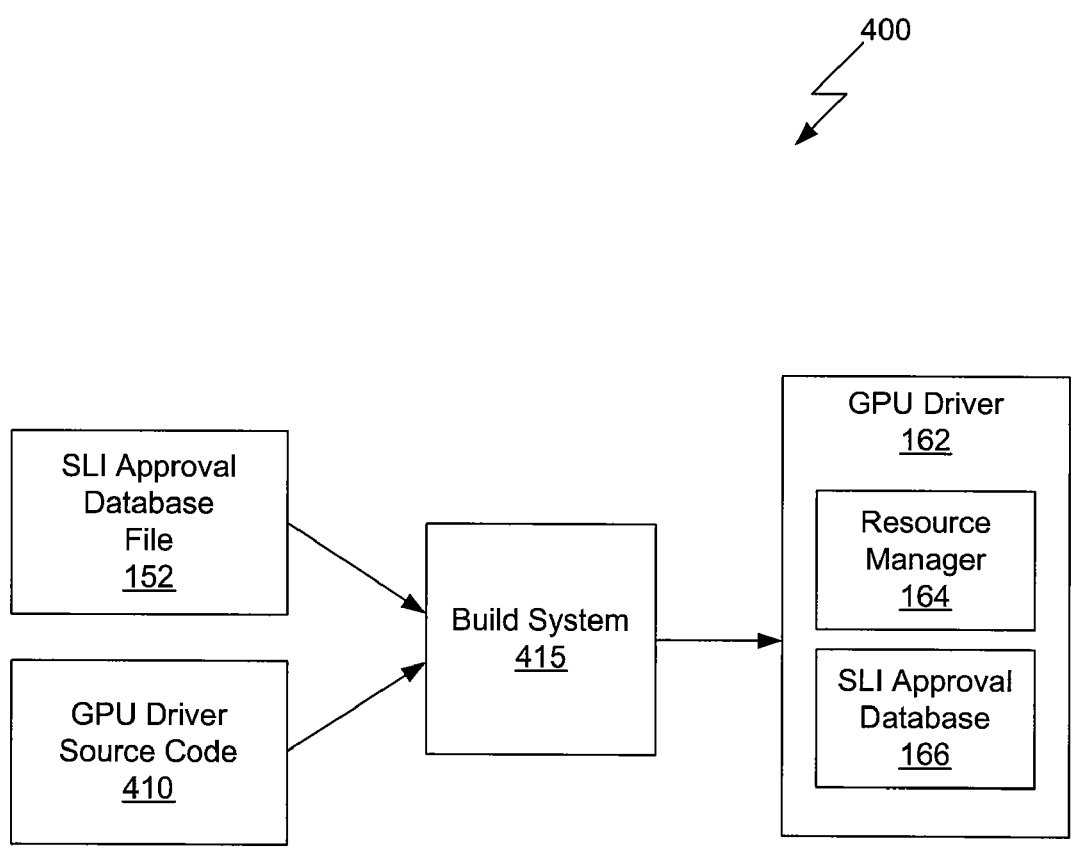
FIG. 4A depicts a build flow for generating a GPU driver, according to one embodiment of the invention.

FIG. 4A depicts a build flow 400 for generating a GPU driver 162, according to one embodiment of the invention. The build flow 400 incorporates GPU driver code 410, the SLI approval database file 152 of FIG. 1, and a build system 415 that is configured to generate the GPU driver 162. The GPU source code 410 is compiled by the build system 415 to generate modules of executable instructions associated with the GPU driver 162. One such module is the resource manager 164.

The build system 415 also compiles the SLI approval database file 152 into the SLI approval database 166, which is included in the GPU driver 162. In one embodiment, the SLI approval database 166 is a compiled data structure that is suitable for linking with the executable code compiled from the GPU driver source code 410. In this embodiment, access to the entries stored in the SLI approval database 166 is provided via direct access to the corresponding compiled data structure.

Figure 4B:
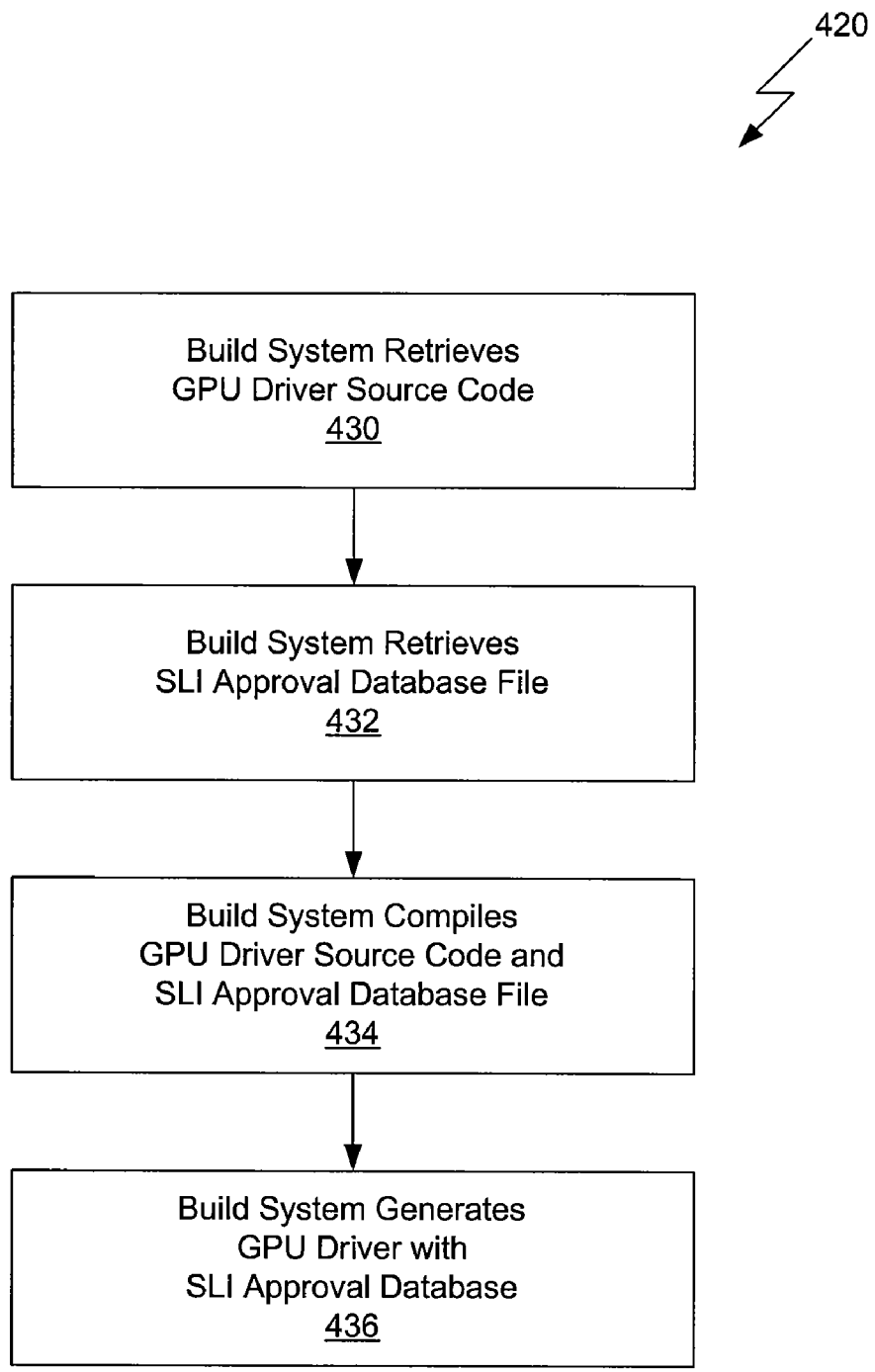
FIG. 4B is flow diagram of method steps for building a GPU driver, according to one embodiment of the invention; and, FIG. 5 is a flow diagram of method steps for searching an SLI approval database for a specified system configuration, according to one embodiment of the invention.

FIG. 4B is flow diagram of method steps 420 for building a GPU driver 162, according to one embodiment of the invention. Although the method steps are described in conjunction with the systems of FIGS. 1, 2 and 4A, persons skilled in the art will understand that any system that performs the method steps, in any order, is within the scope of the invention.

The method begins in step 430, where the build system 415 retrieves source code files, comprising the GPU driver source code. The source code files may be retrieved from a version control system, one or more designated directories, or any other technically appropriate origin.

In step 432, the build system 415 retrieves one or more individual files comprising the SLI approval database file 152. The SLI approval database file 152 may be retrieved from a version control system, one or more designated directories, or any other technically appropriate origin.

In step 434, the build system compiles the GPU driver source code and the SLI approval database file 152. In one embodiment, two or more object files are generated. A first object file includes compiled machine instructions corresponding to the GPU driver source code. A second object file incorporates a compiled data structure corresponding to the SLI approval database file 152.

In step 436, the build system combines the first and second object files to generate a GPU driver 162 with an embedded version of the SLI approval database. In one embodiment, the first and second object files are combined using well-known object linking techniques.

Figure 5:
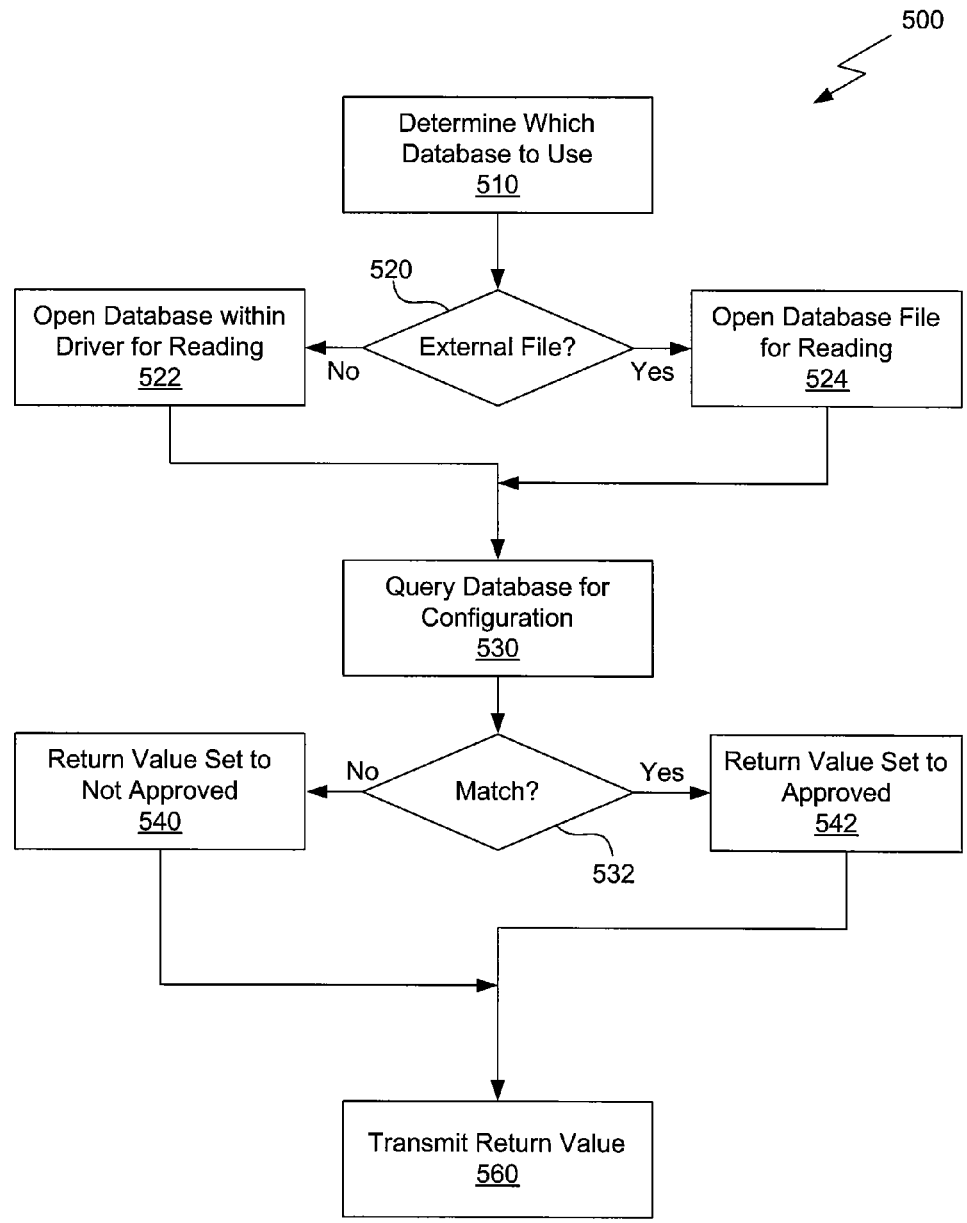

FIG. 5 is a flow diagram of method steps 500 for searching an SLI approval database for a specified system configuration, according to one embodiment of the invention. Although the method steps are described in conjunction with the systems of FIGS. 1 and 2, persons skilled in the art will understand that any system that performs the method steps, in any order, is within the scope of the invention.

The method begins in step 510, where the GPU driver 162 of FIG. 1 determines which SLI approval database is selected for use in granting SLI approval for the current system configuration. This determination process may involve receiving user input from a dialog box, a menu item, a system variable, or the existence of a well-known file name, or any other technically feasible means of designating which SLI approval database is selected. If, in step 520, the selected SLI approval database resides in an external file (the SLI approval database file 152), then the method proceeds to step 524, where the SLI approval database file 152 is opened for reading. The SLI approval database file 152 may reside in a well-known location or may be selected by an authorized user using, for example, a file browser.

In step 530, the selected SLI approval database is queried against the current system configuration to determine whether a matching system configuration approval is present within the selected database. The query involves testing the current system configuration against each approval 340 of FIG. 3, stored in the selected SLI approval database. To test each approval 340, corresponding attributes of the current system configuration are tested against policies 330 within the selected SLI approval database. Persons skilled in the art will recognize that various techniques may be applied to building, managing and querying the selected SLI approval database. If, in step 532, a match is found between the current system configuration and at least one approval 340, within the selected SLI approval database, then the method proceeds to step 542, where a return value is set to "approved." The method terminates in step 560, where the return value is transmitted to a software module, such as a module within the GPU driver 162, configured to enforce the SLI approval status of the current computing device 100.

Referring back to step 520, if the selected SLI approval database resides within the GPU driver 162, then the method proceeds to step 522, where the SLI approval database 166 within the GPU driver 162 is opened for reading. The method then proceeds to step 530.

Referring back to step 532, if a match is not found between the current system configuration and at least one approval 340, within the selected SLI approval database, then the method proceeds to step 540, where the return value is set to "not approved." The method then proceeds to step 560.

In sum, an SLI approval mechanism is disclosed, whereby an SLI approval database is selected by an authorized user and used for determining whether a given system configuration is approved for SLI mode operation. The selected SLI approval database may reside within the GPU driver 162 or within an SLI approval database file 152. The SLI approval database file 152 may be managed and updated with new approvals by an authorized user. When the GPU driver 162 needs to determine whether the current system configuration is approved to run in SLI mode, either the SLI approval database 166, embedded within the GPU driver 162, or the SLI approval database file 152 may be used, as determined by the authorized user. In this way, different approvals may be evaluated by the authorized user without the need to rebuild the GPU driver 162.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

I claim:

1. A method for building an approval database for approving a computing device configuration for operation in scalable link interface (SLI) mode, the method comprising:
retrieving graphics processing unit (GPU) driver source code;
retrieving an SLI approval database file;
compiling the GPU driver source code and the SLI approval database file; and
generating a GPU driver that includes an SLI approval database based on the compiled GPU driver source code and the compiled SLI approval database file.

2. The method of claim 1, wherein the step of compiling comprises creating a first object file that includes compiled machine instructions corresponding to the GPU driver source code and a second object file that incorporates a compiled data structure corresponding to the SLI approval database file.

3. The method of claim 2, wherein the step of generating comprises linking the first object file and the second object file to create the GPU driver.

4. The method of claim 1, further comprising the step of selecting whether to use the SLI approval database included in the GPU driver or an external file to determine whether SLI approval should be granted for the computing device configuration.

5. The method of claim 4, wherein the SLI approval database included in the GPU or the external file is encrypted.

6. The method of claim 4, wherein the external file comprises the SLI approval database file or the SLI approval database file with one or more additional SLI approvals.

7. The method of claim 4, further comprising the step of querying the SLI approval database included in the GPU driver or the external file to determine whether the computing device configuration matches an SLI approval.

8. The method of claim 7, further comprising the step of returning a value set to not approved, if the computing device configuration does not match an SLI approval, and returning a value set to approved, if the computing device configuration does match an SLI approval.

9. A computer-readable storage medium including instructions that, when executed by a processing unit, causes the processing unit to build an approval database for approving a computing device configuration for operation in scalable link interface (SLI) mode, by performing the steps of:
retrieving graphics processing unit (GPU) driver source code;
retrieving an SLI approval database file;
compiling the GPU driver source code and the SLI approval database file; and
generating a GPU driver that includes an SLI approval database based on the compiled GPU driver source code and the compiled SLI approval database file.

10. A computer-readable storage medium of claim 9, wherein the step of compiling comprises creating a first object file that includes compiled machine instructions corresponding to the GPU driver source code and a second object file that incorporates a compiled data structure corresponding to the SLI approval database file.

11. A computer-readable storage medium of claim 10, wherein the step of generating comprises linking the first object file and the second object file to create the GPU driver.

12. A computer-readable storage medium of claim 10, further comprising the step of encrypting the SLI approval database.

13. A computing device configured for scalable link interface (SLI) mode approval, the computing device comprising:
at least one graphics processing unit (GPUs); and
a GPU driver that includes an SLI approval database generated from an SLI approval database file, wherein the GPU driver is configured to compare configuration information for the computing device against approvals included in the SLI approval database to determine whether the computing device may operate in SLI mode.

14. The computing device of claim 13, further comprising a storage device that includes an external SLI approval database comprising the SLI approval database file or the SLI approval database file with one or more additional SLI approvals.

15. The computing device of claim 14, wherein the GPU driver is configured to compare configuration information for the computing device against approvals included in the external SLI approval database to determine whether the computing device may operate in SLI mode.

16. The computing device of claim 15, wherein the GPU driver is configured to select whether to use the SLI approval database included in the GPU driver or the external SLI approval database to determine whether the computing device may operate in SLI mode.

17. The computing device of claim 16, wherein the GPU driver is further configured to query the SLI approval database included in the GPU driver or the external SLI approval database to determine whether the computing device configuration matches an SLI approval.

18. The computing device of claim 17, wherein the GPU driver is further configured to return a value set to not approved, if the computing device configuration does not match an SLI approval, and returning a value set to approved, if the computing device configuration does match an SLI approval.

19. The computing device of claim 14, wherein the SLI approval database included in the GPU or the external SLI approval database is encrypted.

20. The computing device of claim 13, wherein the GPU driver includes a first object file linked to a second object file, and the first object file includes compiled machine instructions corresponding to GPU driver source code, and the second object file incorporates a compiled data structure corresponding to the SLI approval database file.

* * * * *